United States Patent [19]

Mange et al.

[11] Patent Number: 4,839,193
[45] Date of Patent: Jun. 13, 1989

[54] PROCESS FOR PREPARING ALMOND PASTE

[75] Inventors: Christian Mange, Fraisses; Georges-Aloin Allard, St. Etienne, both of France

[73] Assignee: Clextral, France

[21] Appl. No.: 54,703

[22] Filed: May 27, 1987

[30] Foreign Application Priority Data

May 27, 1986 [FR] France ............................ 86 07573

[51] Int. Cl.⁴ ............................................. A23L 1/36
[52] U.S. Cl. ................................... 426/633; 426/448
[58] Field of Search ............... 426/633, 631, 632, 447, 426/448, 445, 516

[56] References Cited

U.S. PATENT DOCUMENTS

| | | | |
|---|---|---|---|
| 3,723,131 | 3/1973 | Bixby | 426/633 |
| 4,049,840 | 9/1977 | Reesman | 426/448 |
| 4,191,786 | 3/1980 | Nappen | 426/631 |
| 4,332,932 | 6/1982 | Harada | 425/208 |
| 4,349,579 | 9/1982 | Raboud | 426/631 |
| 4,367,190 | 1/1983 | Beach | 425/208 |
| 4,607,797 | 8/1986 | Enikolopow et al. | 425/208 |
| 4,639,374 | 1/1987 | Matsunobu | 426/632 |

FOREIGN PATENT DOCUMENTS 616817 2/1927 France .
1128377 1/1957 France .

OTHER PUBLICATIONS

Rose, 1966, The Condensed Chemical Dictionary, Reinhold Publishing Company, New York, pp. 450 and 455.
Lee, 1975, Basic Food Chemistry, AVI Publishing Co., Inc., Westport, CT., pp. 181-183.

*Primary Examiner*—Donald E. Czaja
*Assistant Examiner*—Carolyn Paden
*Attorney, Agent, or Firm*—Pollock, Vande Sande & Priddy

[57] ABSTRACT

Process for preparing almond paste from whole almonds in a continuous sequence of stages involving cooking-extrusion within a screw conveyor having a plurality of regions with threads of different pitch. The temperatures are controlled at each stage so as to effect not only physical transformations, but also to produce a Maillard reaction for a predetermined part of the process.

2 Claims, 3 Drawing Sheets

PROCESS FOR PREPARING ALMOND PASTE

FIELD OF THE INVENTION

The present invention relates to a process and apparatus for preparing almond paste from blanched whole almonds mixed with sugar and various additives.

BACKGROUND OF THE INVENTION

It is known that the manufacture of almond paste involves the preparation of a mother almond paste which is a product of the crushing of a certain quantity of blanched sweet almonds associated in particular with saccharose. The various crushing steps and the different treatments require that this mother paste contain a certain percentage of water.

The mother almond paste thus contains as its principal components almond and saccharose, and a certain percentage of water.

This product takes on the name of almond paste as soon as it has been dehydrated to a water content of about 10% by weight. It is in this step that the various elements are added which permit modification of its texture, taste, appearance, and even its shelf life.

Depending on the sugar content, which may vary from one-third to three-quarters of the total quantity, a secondary distinction may be made in the qualities of the almond pastes, which are identified either as almond pastes for confectionery or as almond pastes for pastry-making.

Generally, the usual composition of almond paste confectionery is the following:

Minimum content of almond oils: 17%
Maximum content of sugar: 66%
Maximum content of residual moisture:
  for a content of almond oils of between 17% and 22%: 10%
  for a content of almond oils of between 22% and 28%: 12%
  for a content of almond oils higher than 28%: 17%

The almond oils derive from the incorporated almonds.

At the present time there are two manufacturing processes which may be distinguished, one being a combined process of cooking and crushing, and the other an evaporation-crushing process.

The first process, also termed the French process, comprises several independent and parallel steps.

First, dry blanched almonds are grated and then subjected to pre-crushing on a special cylinder crusher, for the purpose of tearing a large number of cells which enclose the almond oil, and thereby obtain pure almond paste.

The various sugars, saccharose, invert sugar and glucose syrup are jointly mixed with a certain quantity of water to produce a direct solution, while a cooking step enables the quantity of water to be reduced and the consistency of the paste required for the manufacture to be obtained.

Thus, the products issuing from the two preceding steps are introduced into a combined cooker and malaxator for malaxating, followed by cooling and crushing. It is in the course of this step that the various perfumes, alcohols and other additives, and the required quantity of invert sugar for obtaining the desired proportions, are added to the mixture to produce the almond paste.

The evaporation-grilling process, also termed the German process, is a discontinuous process, but contains all the steps in series.

The blanched white almonds are mixed with crystallized sugar and pre-crushed, and the mixture is then subjected to crushing. Thereafter, water is added to facilitate, during the grilling, Maillard reaction which thus develops the formation of the aromatic substances. Also, evaporation of a certain quantity of water occurs. Cooling is then necessary, and is generally achieved by a current of cold air, and the product thus obtained is termed the mother almond paste. Added to this mother paste are confectioner's sugar, glucose syrup and other additives which, when mixed, result in the almond paste.

The differences between these two processes of course result in variants in the rheological and organoleptic properties of the finished product. Indeed, the color and the taste may vary, since the Maillard reaction is not developed by the same steps nor in the presence of the same constituents.

Moreover, the aromatization or the addition of additives may be carried out more or less easily in either of the processes, and it is clear that there is no fundamental difference between the two processes, both being in series or in parallel, but discontinuous.

In the manufacture of some food products, processes and devices which are as "continuous" as possible have long been sought.

Thus, FR-A-2 257 235 discloses apparatus for treating or manufacturing food products, for example almond paste, whose purpose is to limit the many losses of time due to the necessity to pass from one apparatus to another.

This apparatus mainly comprises, with the vessel for treating the raw materials, two liquid-containing tanks one of which has a heating apparatus for bringing the liquid to the maximum termperature of utilization, whereas the other has a refrigerating apparatus for bringing the liquid to low temperature, and a circulating pump drawing in the liquid is provided for each tank.

There is also known, from FR-A 2 331 966, a process for preparing paste from seeds of stone-fruits, in which the fruit stones are sorted out, washed and shelled, optionally dried and ground with sugar and other ingredients by means of tools rotating very rapidly, after which this paste is grilled at a certain temperature, and finally cooled. During the crushing step itself, the product receives sufficient energy to ensure that the mixture is achieved in an intimate manner, the heating being effected by the direct injection of hot gas, preferably steam.

SUMMARY OF THE INVENTION

An object of the invention is to provide a process and apparatus which permit the production, in a continuous manner and within a very short period of time, of an almond paste from blanched whole almonds.

In the process according to the invention, the entire preparation is carried out by cooking-extrusion within a screw conveyor in a plurality of steps which succeed one another in a continuous manner and comprise; in the downstream direction of conveyance, respectively:

(a) introduction of the blanched whole almonds, saccharose associated with a quantity of water and a mixture of the introduced products;

(b) malaxation or crushing, followed by malaxation of the mixture with a cooking of said mixture at a temperature between 140° and 170° C. for a period sufficient to permit the development of Maillard reactions;

(c) dehydration by sudden expansion of the water contained in the mixture by communication with atmosphere;

(d) compression followed by crushing and malaxation of the mixture, associated with complementary cooking of said mixture at a temperature between 100° and 140° C. to obtain the mother almond paste, (e) secondary dehydration by sudded expansion of the water contained in the mother almond paste by communication with atmosphere, associated with cooling to lower the temperature of the mother almond paste to below 100° C.;

(f) introduction of additives in a continuous manner;

(g) mixing of the mother almond paste and the additives, associated with progressive cooling to a temperature between 20° and 30° C. for obtaining the almond paste; and (h) extrusion of the almond paste through at least one die placed at the downstream end of the screw conveyor.

The apparatus according to the invention for carrying out the process comprises a screw conveyor including at least two imbricated screws, driven in rotation inside an elongated sleeve and each constituted by adjacent sections provided with conveying and specific treatment elements and defining successive regions corresponding to the successive steps of the preparation of the product, these regions including at least:

(a) an introduction and mixing region into which opens at least one orifice provided in the sleeve, for supplying blanched whole almonds and saccharose associated with a certain quantity of water;

(b) a malaxation region or a crushing and malaxation region with cooking of the mixture at a temperature between 140° and 170° C., the sleeve being provided in said regions with heating means;

(c) a region for the sudden expansion and heating of the mixture provided with large-pitch helical threads in which the sleeve has an orifice for communication with atmosphere;

(d) a region for the compression and heating of the mixture provided with helical threads having a progressively smaller pitch;

(e) a complementary region for crushing, malaxation and cooking of the mixture at a temperature between 100° and 140° C. for the obtainment of the almond paste;

(f) a region for the sudden expansion of the mother almond paste provided with helical threads having a large pitch, in which the sleeve has an orifice for communication with atmosphere, and for cooling said mother almond paste to a temperature below $\phi$° C.;

(g) a region for incorporating at least one additive, for mixing and for cooling to a temperature between 20° and 30° C. for the obtainment of the almond paste, said region being provided with helical threads having a smaller and constant pitch, and in which the sleeve has at least one orifice for the introduction of said at least one additive; and and a region for extruding the almond paste through at least one die placed at the downstream end of the screw conveyor.

BRIEF DESCRIPTION OF THE DRAWINGS

Further features and advantages of the invention will be apparent from the following description, with reference to the accompanying drawings, in which.

DESCRIPTION OF PREFERRED EMBODIMENTS

Figure 1:
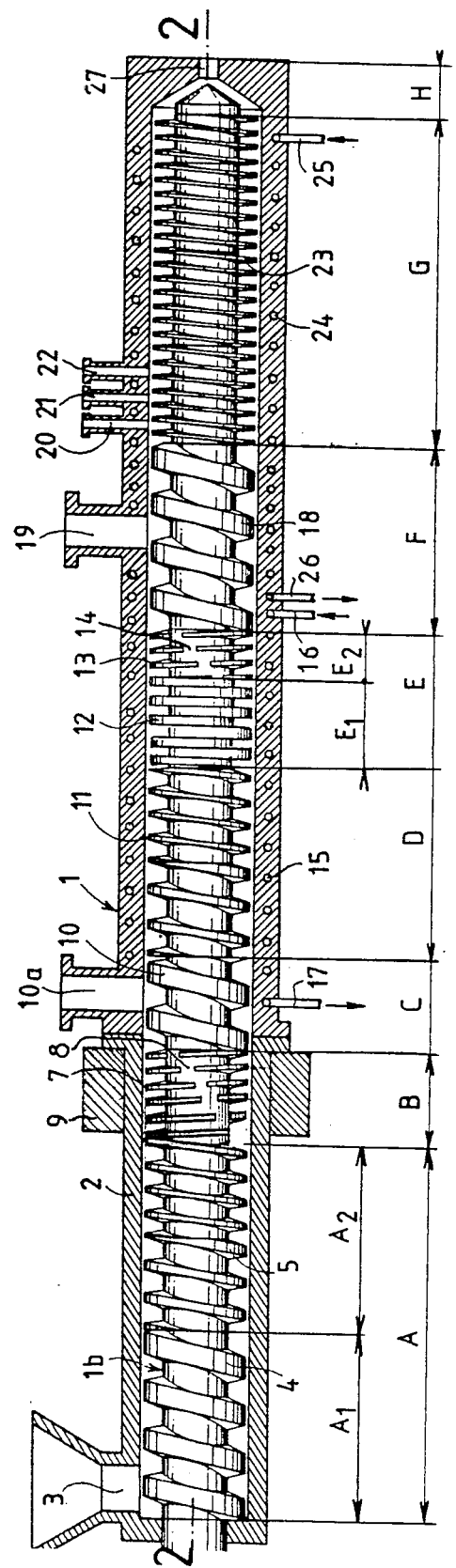
FIG. 1 is a sectional view in a vertical plane of a screw device for carrying out the process according to the invention.
Figure 2:
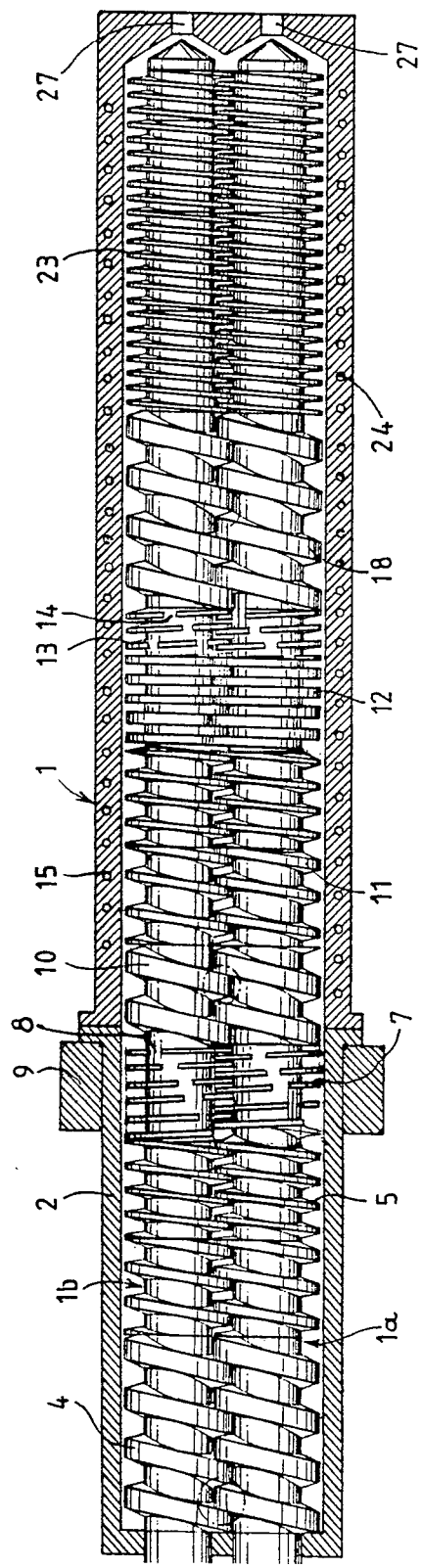
FIG. 2 is a sectional view along line 2—2 of FIG. 1.

The device for carrying out the process shown diagrammatically in FIGS. 1 and 2 comprises a screw conveyor 1 having generally at least two screws 1a and 1b, driven in rotation about their axes within an elongated enclosure forming a sleeve 2 which surrounds the screws.

As can be seen in FIG. 2, the screws 1a and 1b are provided with peripheral threads or other elements which engage with one another, and the inner wall of the sleeve 2 forms two intersecting cylindrical lobes having an inside diameter slightly larger than the outside diameter of the threads or peripheral elements. These threads are imbricated with respect to each other and, in the illustrated embodiment, the two threads 1a and 1b are driven in the same direction so that the threads are identical and merely offset relative to each other.

The screw conveyor 1 is formed by a plurality of successive regions each corresponding to a particular function:

a first region A for supplying and mixing the starting ingredients, a second region B for the malaxation of the mixture with heating to a given temperature, a third region C for dehydration of the mixture, a fourth region D for the progressive compression of the mixture, associated with cooking, a fifth region E for crushing and malaxation until the mother almond paste is obtained, a sixth region F for secondary dehydration of the paste, with cooling, a seventh region G for the incorporation of additives and mixing, associated with cooling for the obtainment of the almond paste, and a final region H for the extrusion of the final product.

The screws 1a and 1b are advantageously constituted by splined shafts on which are stacked screw sections constituted by collars, the inner part of which is provided with splines corresponding to those of the shaft, whereas the outer portion is provided with threads having varied pitches or other treating and conveying peripheral elements. A rather large number of sections may be provided, whereby it is possible to vary the pitch, the depth and the number of the threads, and the length of each regions.

In the first region A for supplying and mixing the ingredients, the sleeve 2 is provided with an orifice 3 for introducing, by means of a metering device (not shown) blanched whole almonds, saccharose and a certain quantity of water. In the first section $A_1$, the screws 1a and 1b are provided with threads 4 having a large pitch which rapidly convey the material introduced through the orifice 3, the latter opening broadly onto the two screws to facilitate the distribution of the material in the threads.

The ingredients are therefore immediately conveyed toward the downstream end and mixed by the effect of the rotation and the interengagement of the screws 1a and 1b, this mixing effect being amplified by the use of a section $A_2$ for compressing the material and provided with threads 5 having a smaller pitch.

The saccharose introduced through the orifice 3 at the same time as the blanched almonds and the water is generally in the form of crystallized sugar, this form being preferred to that of confectioner's sugar which has the drawback of producing agglomerates in the product supply hopper.

The quantity of water introduced is dependent on the water absorbing capacity of the almonds, which in turn depends on the ratio between the fatty materials and the proteins.

Thereafter, the mixture passes into a malaxation region B, which is provided with threads 7 having a reversed direction in which are provided openings 8 which extend radially from the shaft of each screw $1a$ and $1b$ to the periphery of the thread and which are evenly spaced around the axis. The screws $1a$ and $1b$ are so set that two openings 8 periodically come into coincidence in the central interengagement region. This results in the passage of a controlled flow of material toward the downstream end, which achieves a slow-down in the region B and consequently a compression at the upstream end, producing an intense malaxation effect which facilitates the mixture of the ingredients.

In this region B, the sleeve 2 is surrounded by a heating jacket 9 which may be, for example, an electric induction heating means. Consequently, the mixed ingredients, whose temperature has already been increased in the region $A_2$ by friction, may be heated up to a given temperature. Thus, the mixed product which is at a temperature on the order of 60° to 90° C. in the region $A_2$ is brought to a temperature of about 140° to 170° C. in the region B where occur Maillard reactions which develop the taste of the product.

At the outlet of the region B, the mixed product thus produced passes into a region C, termed an expansion region. In this region C producing a sudden expansion, the screws $1a$ and $1b$ have threads 10 of a large pitch communicating with atmosphere through an opening $10a$ provided in the sleeve 2. The purpose of this expansion is to bring about the required partial dehydration of the mixture before a further shearing and malaxation step.

The mixture then passes into the region D where the screws $1a$ and $1b$ are provided with threads 11 of direct pitch, the latter being reduced in the downstream direction to create a compression region.

Thereafter, the mixture passes into a region E for effecting crushing and malaxation.

For this purpose, the region E has a first, crushing section $E_1$ formed by eccentric malaxation discs 12 which cause the passage of the mixture in the downstream direction with a drawing effect between the discs 12 and the sleeve 2. The number of malaxation discs 12 is a function of the degree of fineness of the material to be obtained. The section $E_1$ is followed by a section $E_2$ provided with threads 13 having an inverted direction in which are formed openings 14 evenly spaced around the axis.

In regions D and E, the sleeve 2 is provided with a heating circuit 15 constituted by passageways provided within said sleeve 2 and traversed by a heat-carrying fluid circulating between an inlet orifice 16 and a discharge orifice 17. This heating circuit 15 enables the mixture to be maintained in the regions D and E at a temperature between 100° and 140° C.

It is the course of this crushing and shearing step in region E that the mother almond paste is produced.

At the outlet of the region E, the paste is introduced into region F where it undergoes a further dehydration by sudden expansion, which reduces the quantity of water contained in said paste. In this region F of sudden expansion, the screws $1a$ and $1b$ have threads 18 of a large pitch communicating with atmosphere through an opening 19 provided in the sleeve 2.

The large-pitch threads 18 permit driving of the paste in a thin layer to the downstream end with a turning over effect on the paste from one screw to the other in the interengaging region.

The paste is in this way conveyed to the region G for effecting the final mixing, at the beginning of which there may be introduced through small openings 20, 21 and 22 various additives required for the obtainment of the almond paste after mixture in the region G. For this purpose, the screws $1a$ and $1b$ are provided in the region G with threads 23 having a constant and narrow pitch to achieve the desired mixing between the paste and the various additives.

Further, the sleeve 2 has, in the regions F and G, a cooling circuit 24 formed by passageways provided within the wall of the said sleeve and in which circulates a heat carrying fluid between an inlet orifice 25 and a discharge orifice 26. This cooling circuit enables the temperature of the paste to be progressively lowered, down to a temperature between 20° and 30° C.

One of the additives introduced may, for example, be glucose syrup, which acts on moisture retention and on the prevention of crystallization of the saccharose introduced at the beginning of the operation, and which finally has a function to perform in the rheologic properties of the final product, and in particular its viscosity, fluidity and plasticity.

Another additive constituted by sorbitol enables the fluidity and plasticity to be controlled, but it is principally used to increase the osmotic pressure of the liquid phase, which improves the bacteriological stablility of the almond paste and reduces its tendency to dry.

A complement of saccharose may be introduced in the form of confectioners's sugar for the purpose of improving the rheolobic properties and obtaining the final formula of the desired product.

The region G having threads of narrowed pitch therefore enables the paste and the additives to be mixed to obtain almond paste, and the pressure to be raised to achieve in region H an extrusion through a die 27 located at the downstream end of the sleeve 2. The die 27 permits the desired shape to be given to the product which is extruded in the form of one or more cylindrical-shaped products cut into elements by a cutting device (not shown) located at the downstream end of the sleeve 2.

As mentioned before, to obtain the Maillard reactions, the mixture must be heated to a termperature of between 140° C. and 170° C. However, these reactions must not continue throughout the preparation stage in the screw conveyor, since this might alter the taste of the almond paste obtained and result in a brown color unsuitable for its use in confectionery. This is why the almond paste is cooled in the regions F and G of the screw conveyor to stop the Maillard reactions and produce a product which has, as it leaves the extrusion die, sufficient consistency to permit its handling.

It will be understood that the treating conditions will be determined as a function of the starting ingredients and of the product it is desired to produce, the scope of the invention not being limited to the details of the process and device which have been described, since the various parts thereof may be modified.

Figure 3:
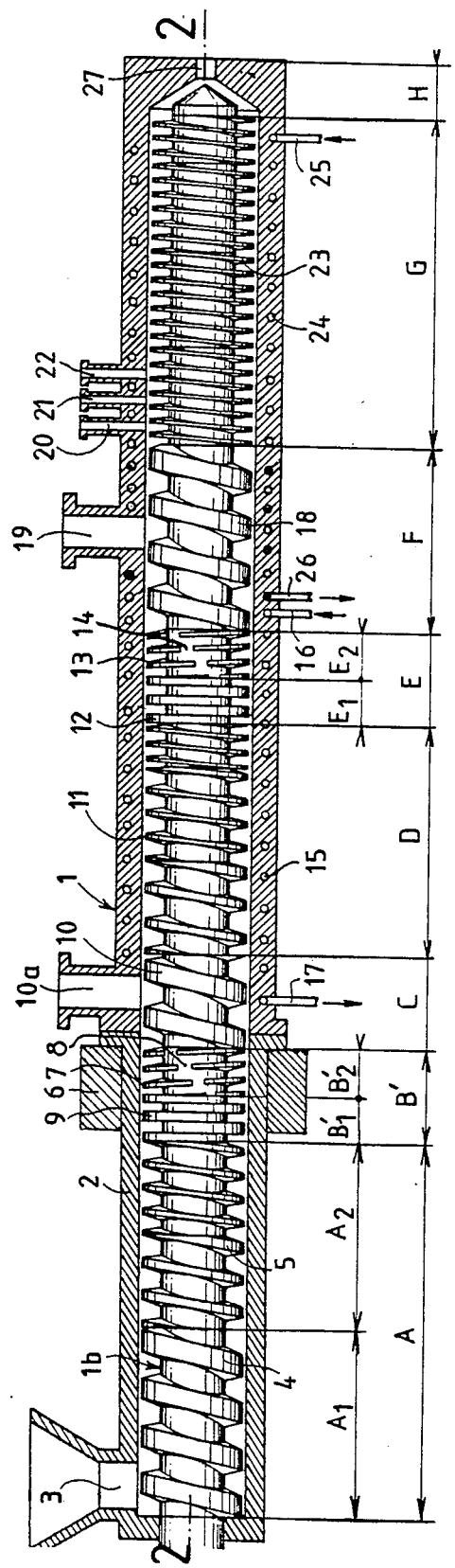
FIG. 3 is a sectional view in a vertical plane of an alternative embodiment of the device.

Indeed, in the embodiment shown in FIG. 3 in which the elements corresponding to similar elements shown in FIGS. 1 and 2 carry the same reference characters, the malaxating region B is replaced by a crushing and malaxating region B'.

For this purpose, the region B' has a first crushing section B'$_1$ formed by concentric malaxating discs 6 which permits a passage of the mixture to the downstream end with a drawing effect between the discs 6 and the sleeve. The number of malaxating discs 6 is a function of the degree of fineness of the material to be produced. The first section B'$_1$ is followed by a second section B'$_2$ provided with threads 7 having a reversed direction in which openings 8 are provided.

Further, the crushing and malaxating region E has a first crushing section E$_1$ formed by malaxating discs 12, followed by a section E$_2$ provided with threads 13 which have a reversed direction and in which openings 14 are provided. However, in this embodiment, the number of malaxating discs 12 making up the section E$_1$ is smaller than in the preceding embodiment, and the region D has a larger number of threads of a normal direction.

The invention permits an almond paste to be produced in a continuous manner within a very short period of time from blanched whole almonds and the addition of any type of additives at any stage of the production process.

Further, owing to the large rise in temperature achieved under pressure in the screw conveyor, a sterilizing effect is obtained, which is conserved to the outlet of the machine, if, at least, the additives introduced are themselves sterilized.

What is claimed is:

1. A process for preparing almond paste from blanched whole almonds; the entire preparation being carried out by cooking-extrusion within a screw conveyor having a plurality of regions with threads of different pitch in a continuous sequence of steps comprising, in the downstream direction of conveyance,
   (a) introducing blanched whole almonds, saccharose, and water, and mixing the introduced products;
   (b) malaxating the mixture with cooking of said mixture at a temperature between 140° and 170° C. for a period sufficient to permit the development of Maillard reactions;
   (c) preliminarily dehydrating the mixture by sudden expansion of the water contained in the mixture by communication with atmosphere;
   (d) compressing, then crushing and malaxating the mixture simultaneously with a second cooking of said mixture at a temperature between 100° C. and 140° C. to obtain mother almond paste;
   (e) effecting a secondary final dehydration by sudden expansion of the water contained in the mother almond paste by communication with atmosphere, with cooling by lowering the temperature of the mother almond paste to below 100° C.;
   (f) continuously introducing additives comprising glucose syrup, sorbitol and a complement of saccharose in the form of confectioner's sugar, said additives being successively introduced into the mixture;
   (g) mixing the mother almond paste and the additives with progressive cooling to a temperature between 20° C. and 30° C. to obtain the almond paste; and
   (h) extruding the almond paste through at least one die located at a downstream end of the screw conveyor.

2. A process for preparing almond paste from blanched whole almonds, the entire preparation being carried out by cooking-extrusion within a screw conveyor in a continuous sequence of steps comprising, in the downstream direction of conveyance,
   (a) introducing blanched whole almonds, saccharose, and water, and mixing the introduced products;
   (b) crushing and then malaxating the mixture with cooking of said mixture at a temperature between 140° and 170° C. for a period sufficient to permit the development of Maillard reactions;
   (c) preliminarily dehydrating the mixture by sudden expansion of the water contained in the mixture by communication with atmosphere;
   (d) compressing, then crushing and malaxating the mixture simultaneously with a second cooking of said mixture at a temperature between 100° and 140° C. to obtain mother almond paste;
   (e) effecting a secondary final dehydration by sudden expansion of the water contained in the mother almond paste by communication with atmosphere, with cooling by lowering the temperature of the mother almond paste to below 100° C.,
   (f) continuously introducing additives comprising glucose syrup, sorbitol and a complement of saccharose in the form of confectioner's sugar, said additives being successively introduced into the mixture;
   (g) mixing the mother almond paste and the additives with progressive cooling to a temperature between 20° and 30° C. to obtain the almond paste; and
   (h) extruding the almond paste through at least one die located at a downstream end of the screw conveyor.

* * * * *